United States Patent
McWilliams

(10) Patent No.: US 10,424,389 B2
(45) Date of Patent: Sep. 24, 2019

(54) INTEGRATED CIRCUIT DEVICE USING MULTIPLE ONE-TIME PROGRAMMABLE BITS TO CONTROL ACCESS TO A RESOURCE

(71) Applicant: Hewlett-Packard Development Company, L.P., Houston, TX (US)

(72) Inventor: John L McWilliams, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/064,168

(22) PCT Filed: Apr. 1, 2016

(86) PCT No.: PCT/US2016/025691
§ 371 (c)(1),
(2) Date: Jun. 20, 2018

(87) PCT Pub. No.: WO2017/171865
PCT Pub. Date: Oct. 5, 2017

(65) Prior Publication Data
US 2018/0374554 A1    Dec. 27, 2018

(51) Int. Cl.
| | |
|---|---|
| *G11C 17/16* | (2006.01) |
| *G11C 7/24* | (2006.01) |
| *G11C 16/22* | (2006.01) |
| *G11C 29/02* | (2006.01) |
| *G11C 29/12* | (2006.01) |
| *G11C 17/18* | (2006.01) |

(Continued)

(52) U.S. Cl.
CPC ............. *G11C 17/16* (2013.01); *G11C 7/24* (2013.01); *G11C 16/22* (2013.01); *G11C 17/18* (2013.01); *G11C 29/027* (2013.01); *G11C 29/1201* (2013.01); *G11C 29/12005* (2013.01); *G11C 2029/0403* (2013.01); *G11C 2029/4402* (2013.01)

(58) Field of Classification Search
CPC ..... G11C 13/0059; G11C 17/16; G11C 16/05; G11C 2216/26; G11C 16/26
USPC ......................................... 365/96, 94, 225.7
See application file for complete search history.

(56) References Cited

U.S. PATENT DOCUMENTS 9,203,617 B2   12/2015 Ducharme et al.
9,652,637 B2 *  5/2017 Dellow ................. G06F 21/76
(Continued)

OTHER PUBLICATIONS

Xilinx, "Vivado Design Suite User Guide—Programming and Debugging", Nov. 19, 2014, http://www.xilinx.com/support/ ~ 170 pages.

*Primary Examiner* — Han Yang
(74) *Attorney, Agent, or Firm* — HP Inc. Patent Department

(57) ABSTRACT

An integrated circuit device that utilizes multiple OTP bits to enable and re-enable access to evaluation and testing components comprises a set of multiple one-time programmable (OTP) bits, a programming module operable to trigger a change in each bit of the set of multiple OTP bits, decode logic to determine a value for a collective state of the set of multiple OTP bits, and a control element to control access to at least one resource of the integrated circuit device based on a value of the collective state for the set of multiple OTP bits.

15 Claims, 2 Drawing Sheets

(51) Int. Cl.
G11C 29/04 (2006.01)
G11C 29/44 (2006.01)

(56) References Cited

U.S. PATENT DOCUMENTS

| | | |
|---|---|---|
| 2007/0094507 A1* | 4/2007 | Rush ............... H04L 63/123 |
| | | 713/176 |
| 2007/0157000 A1 | 7/2007 | Qawami et al. |
| 2007/0162964 A1 | 7/2007 | Wang et al. |
| 2008/0148001 A1 | 6/2008 | Gehrmann et al. |
| 2010/0009640 A1 | 1/2010 | Haban et al. |
| 2012/0081942 A1 | 4/2012 | Kurjanowicz |
| 2013/0086385 A1 | 4/2013 | Poeluev |
| 2013/0238831 A1 | 9/2013 | He |
| 2014/0344960 A1 | 11/2014 | Adams |
| 2015/0009743 A1 | 1/2015 | Chung |

* cited by examiner

INTEGRATED CIRCUIT DEVICE USING MULTIPLE ONE-TIME PROGRAMMABLE BITS TO CONTROL ACCESS TO A RESOURCE

BACKGROUND

Integrated circuit devices and products often employ testing and debug elements which provide unrestricted access to the circuits and elements of the device. When integrated circuit devices are made available to customers or public use, the manufacturer or developer of the integrated circuit device typically disables access to such testing and debug elements.

DETAILED DESCRIPTION

Figure 1A:
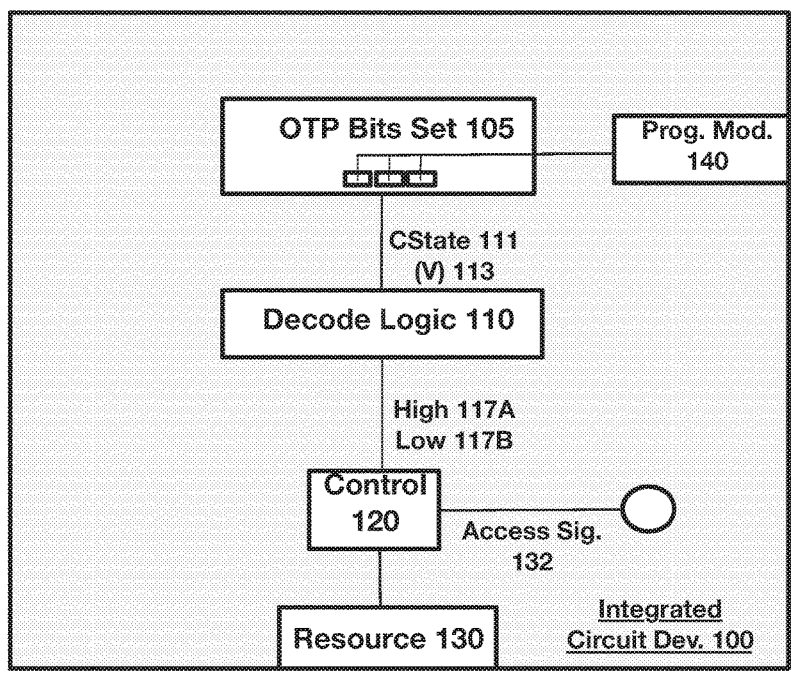
FIG. 1A illustrates an example integrated circuit device to control access of protected resources using multiple one-time programmable ("OTP") bits.

Examples include an integrated circuit device that uses multiple one-time programmable bits to control access to a resource or set of resources of the integrated circuit device. In some examples, the integrated circuit device utilizes multiple OTP bits to enable and re-enable access to evaluation and testing components which may be embedded or integrated onto the device. Among other benefits, this allows the evaluation and testing components of the integrated circuit device to be available for developers both (i) before the integrated circuit device is shipped or deployed for use, and (ii) when the integrated circuit device or product is returned for debugging, troubleshooting or evaluation. When, however, the integrated circuit device is in use, examples utilize OTP bits to guard the evaluation and testing components from unauthorized use.

While numerous examples are described in context of evaluation and/or testing components of an integrated circuit device, examples provide for a control sub-system on an integrated circuit device which enables multiple instances of enabling and disabling access to a given resource using multiple OTP bits. In the context of evaluation and testing components, the resource can correspond to a given element, or to a port which provides access to such components. In other context, the resource can correspond to components or components of the integrated circuit device which serve other purposes (e.g., memory to store protected data).

The manufacturing of integrated circuits and products, such as Application Specific Integrated Circuits (ASICs) and Application Specific Standard Products (ASSPs), typically involve the integration of various development and troubleshooting features which are utilized to test and evaluate the product or device before it is shipped to a customer or user. Under conventional practices, such development and troubleshooting features provide product developers with access to the inner workings of the ASICs and ASSP. However, in order to avoid unauthorized access or exploitation of such features, manufacturers and developers typically permanently disable such features before shipping the product for use.

Examples recognize that with increasing sophistication of integrated circuit devices and their working environment, the likelihood that such devices fail to meet a desired purpose or performance level increases. Examples further recognize that enabling development and troubleshooting features on integrated circuit devices after such devices have been deployed in their working environment by customers can improve the ability of the manufacturer or developer to understand what refinements can be made to the devices to improve operability and performance. Among other benefits, examples provide for integrated circuit devices and products which securely integrate development and troubleshooting features that can be disabled and then re-enabled at least one time. When such features are disabled, a product of the integrated circuit device can be shipped and deployed in a customer environment. In the event the product is flagged for troubleshooting or debugging (e.g., customer returns the product, or requests onsite service), the development and troubleshooting features can be re-enabled at least one time. Further, in some variations, the product can be re-deployed for use with the development and troubleshooting features disabled again.

Some examples provide for an integrated circuit device or product that can be operated to re-enable trace capabilities, Built In Self Test (BIST), JTAG, performance monitors, and custom hardware for troubleshooting and testing features. Among other benefits, such features can provide for a high level of controllability and observability for both hardware and software functionality of the integrated circuit device or product. In the context of post-deployment testing and evaluation, such development and troubleshooting features greatly enhance the ability of developers to diagnose and adapt the integrated circuit or product for a particular working environment.

According to some examples, an integrated circuit device includes multiple one-time programmable ("OTP") bits, decode logic, and a control element for controlling access to a protected resource of the integrated circuit device. The decode logic determines a value for a collective state of the set of OTP bits. The control element controls access to the protected resource of the integrated circuit based on the value of the collective state of the multiple OTP bits.

In some implementations, an integrated circuit device includes three OTP bits, and a value of the collective state of the three OTP bits can be one of (i) first state (0,0,0)—an initial state of the integrated circuit device in which the control element enables access to the integrated development and troubleshooting features of the device; (ii) second state (0,0,1)—the control element disables access to the integrated development and troubleshooting features, to protect the device from unauthorized access and use; (iii) third state (0,1,1)—the control element re-enables access to the integrated development and troubleshooting feature; and (iv) fourth state (1,1,1)—the control element disables the integrated development and troubleshooting features. In such implementations, the first state may be for an evaluation, testing or debugging phase prior to the device's deployment, the second state may be for a customer or end user use, the third state may be triggered by the manufacturer or developer when the device or product is flagged for evaluation (e.g., device or product is returned by the customer), and the fourth state may be again for a customer or end user use.

FIG. 1A illustrates an example integrated circuit device to control access of protected resources using multiple one-time programmable ("OTP") bits. According to some examples, an integrated circuit device can correspond to an ASIC or ASSP, having integrated one or multiple development and troubleshooting features. With reference to an example of FIG. 1, the device 100 includes an OTP bit set (or array) 105, decode logic 110, control element 120, evaluation and testing components ("E/T components") 130, and a programming module 140. The E/T components 130 may represent one or multiple evaluation, testing, development and troubleshooting features of the integrated circuit device 100. For example, the E/T components 130 may include components, features and other resources for implementing trace capabilities, Built In Self Test (BIST), JTAG, performance monitors, and custom hardware troubleshooting and testing features.

Decode logic 110 receives the collective state 111 of multiple OTP bits 105, and decodes the set to generate a high (e.g., enable) signal 117A or low (e.g., disable) signal 117B. The decode logic 110 may determine a value 113 for a collective state 111 of the set of OTP bits 105, and the value 113 for the collective state 111 may determine whether the decode logic 110 outputs the high (e.g., enable) 117A or low (e.g., disable) signal 117B. When the set of OTP bits 105 is three bits, the value of the collective state may include four possible states ((0,0,0), (0,0,1), (0,1,1), (1,1,1)), with each of the enable and disable signals 117A, 117B being a corresponding output for two of the four states.

The control component 120 receives the enable or disable signal 117A, 117B from the decode logic 110. The control component 120 can enable access to the E/T components 130 based on the output from the decode logic 110. For example, the control component 120 can enable access to the E/T components 130 when the control component 120 receives the enable signal 117A, or alternatively, when the control component 120 receives the disable signal 117B. According to some examples, the control component 120 is a gate structure which enables or restricts access to the E/T components 130. For example, the control component 120 may be implemented as an AND gate which enables access to the E/T components 130 when an access signal 132 is signaled with the enable signal 117A. The access signal 132 may be signaled from, for example, an interface to an external tool.

The programming module 140 may operate to flip individual OTP bits of the set 105. Based on the physical structure of OTP bits, when individual bits are flipped (or switched) from "0" to "1", the change in state is permanent. The programming module 140 may trigger individual OTP bits, using for example, a manufacturing or developer interface. After manufacturing is complete, the collective state of the OTP bits may correspond to (0,0,0), such that the output signal of the decode logic 110 is high (e.g. enable). The control component 120 can enable access to various E/T components 130, which may include embedded and integrated components of the device 100 which are specifically designed for use in a development and troubleshooting phase. In this phase, a developer, for example, may utilize numerous embedded and integrated components on the device 100 for testing, debugging, evaluation etc.

Once the development and troubleshooting phase is complete, the programming module 140 can be operated to trigger a first bit of the OTP bits to become "1", resulting in the output signal of the decode logic 110 being switched to low (e.g., or disable). The control component 120 can preclude access to the E/T components 130 when the output signal of the decode logic 110 switches. This switch may precede unsecure deployment or use of the device 100, such as when the device or product is shipped to a customer for use.

In the event the device 100 is returned for further troubleshooting or testing, the programming module 140 can trigger a second bit of the OTP bits to become "1", resulting in the output signal of the decode logic 110 being switched to high (e.g., or enable). The control component 120 can once again enable access to the E/T components 130 when the output signal of the decode logic 110 switches. This switch can coincide with, for example, a post-manufacturing debug or evaluation phase. When the phase is complete, the programming module 140 can be operated to trigger a third bit of the OTP bits to become "1", resulting in the output signal of the decode logic 110 being switched to low (e.g., or disable). In this phase, the device 100 may be redeployed for unsecure use (e.g., device may be returned to customer).

Figure 1B:
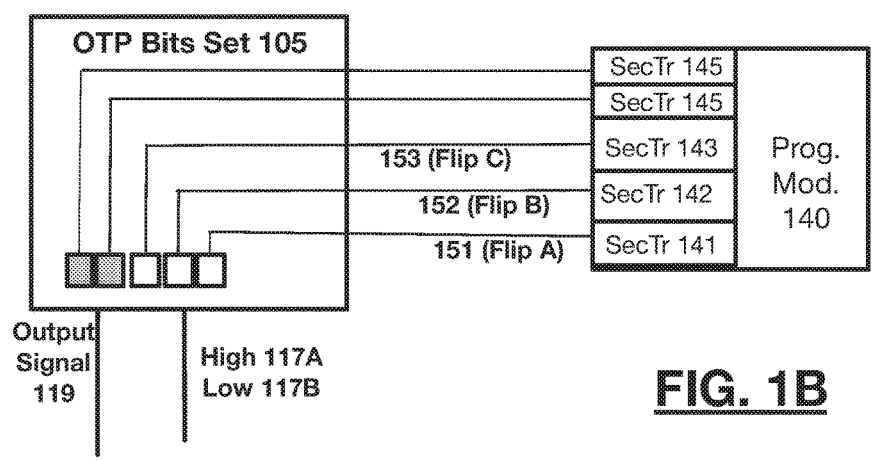
FIG. 1B illustrates an example control sub-system for accessing a resource of an integrated circuit device.

FIG. 1B illustrates an example control sub-system for accessing a resource of an integrated circuit device. In particular, examples provide for utilizing OTP bits to enable access to evaluation and troubleshooting components of an integrated circuit device. In an example of FIG. 1B, the programming module 140 includes at least one secure trigger to selectively trigger at least one of the OTP bits. In one implementation, the programming module 140 triggers each of three OTP bits. For such an implementation, examples recognize that the second OTP bit is a potential source of vulnerability, because an unauthorized user can gain access to the E/T components 130 by triggering the second OTP bit using the programming module 140. To prevent such occurrence, the programming module 140 may utilize multiple layers of security protocols or features, including software and/or hardware features that prevent unauthorized users to access the programming module 140 or to trigger individual OTP bits.

In some examples, the programming module 140 includes at least one trigger mechanism 141 which can enable a corresponding trigger signal 151 to switch some or all of the OTP bit to "1". In some variations, a second or third trigger mechanism 142, 143 can enable a corresponding trigger signal 152, 153 to switch corresponding second and third OTP bits, respectively. In such an example, each of the first, second and third trigger mechanisms 141, 142, 143 can include a same security feature to generate the corresponding trigger signals 151, 152, 153. In variations, the first, second and third trigger mechanisms 141, 142, 143 can have different requirements, features, security level or source (e.g., manufacturer, customer, third-party vendor, etc.). Thus, for example, the second trigger mechanism 142 (for triggering the second OTP bit) can have added security features, and/or may include customizations specified for a particular customer, environment of use, or other consideration.

While some examples as described provide for the set of OTP bits 105 to have three bits, in variations, more OTP bits can be utilized in order to provide additional occurrences of enabling or disabling access to the E/T components 130. For example, the set of OTP bits 105 can include 5 bits in order provide for an additional instance of enabling and disabling of access to the E/T components 130. A separate trigger mechanism 145 can be provided for triggering the fourth (re-enable access to the E/T components 130) and/or fifth (re-disable access to the E/T components 130) OTP bits.

Still further, in other variations, an output of the decode logic 110 can include an additional output signal 119 to provide for an additional enable/disable signal which can be used with the control component 120, or a different 120, to enable access to a different variation or type of secured resource. For example, some evaluation or debugging features may be made available through a second control mechanism, which may be tied to the second output signal 119. The decode logic 110 may, for example, set the 119 low (e.g., disable) by default, and switch the second output 119 high in response to the collective state of the OTP bits reflecting (1,1,1,1,0).

Figure 2:
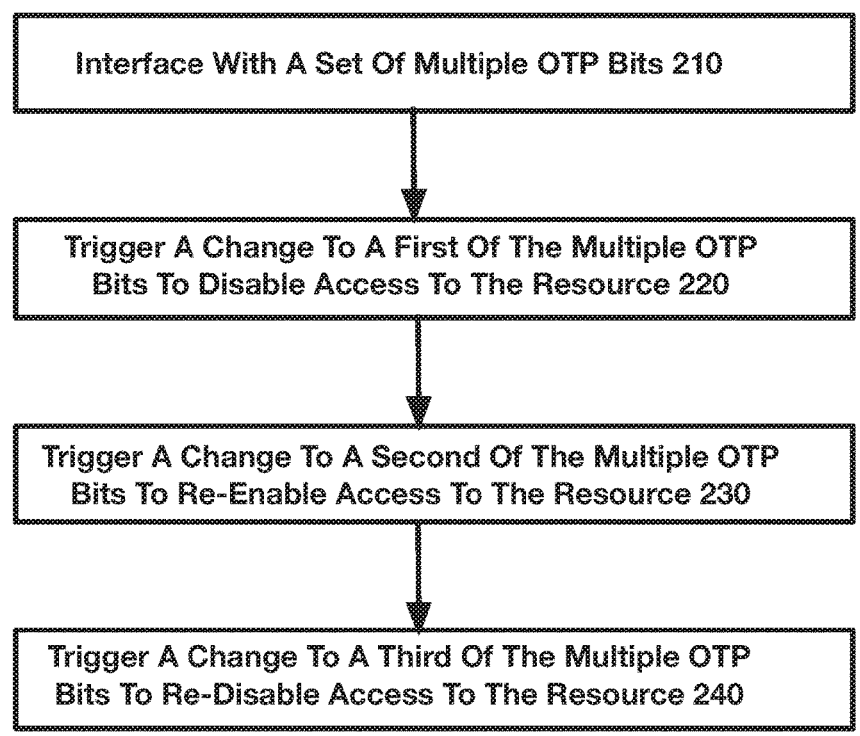
FIG. 2 illustrates an example method for controlling access to a protected resource of an integrated circuit device.

FIG. 2 illustrates an example method for controlling access to a protected resource of an integrated circuit device. An example method such as shown and described with FIG. 2 may be implemented using components of an integrated circuit device such as described with FIG. 1A. Accordingly, reference may be made to elements of FIG. 1A and FIG. 1B for purpose of illustrating suitable components or elements for performing a step or sub-step being described.

With reference to an example of FIG. 2, the integrated circuit device 100 may utilize a set of OTP bits 105 to control access to a resource such as the E/T components 130. The programming module 140 may interface with the set of OTP bits 105 in order to control access to the E/T components 130 (210). As described with other examples, the set of OTB bits 105 enable a developer (e.g., manufacturer, debugger, etc.) to disable access to the E/T components 130 multiple times.

According to examples, a first bit of the OTP bits is triggered to change in order to disable access to the E/T components 130 (220). In one implementation, the programming module 140 includes a trigger mechanism 141 to trigger the first bit to change when, for example, the integrated circuit device 100 is shipped. The E/T components 130 may be disabled in order to preclude customers or unauthorized users from accessing the E/T components 130.

The second bit of the OTP bit 105 may be triggered to change in order to re-enable access to the E/T components 130 (230). A developer may operate the programming module 140 in order to trigger the second bit when the integrated circuit device 100 is returned for troubleshooting after being deployed. In some examples, the programming module 140 may utilize the second trigger mechanism 142 in order to trigger the second bit. The second trigger mechanism can, for example, implement an additional security layer or protocol, to ensure a developer or other authorized individual accesses the E/T components 130.

The developer may operate the programming module 140 to trigger a change to a third bit of the set of OTP bits in in order to re-disable access to the E/T components 130 (240). For example, the developer may re-deploy or ship the integrated circuit device 100 to the customer or public.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. An integrated circuit device comprising:
    a set of multiple one-time programmable (OTP) bits;
    a programming module operable to trigger a change in each bit of the set of multiple OTP bits;
    decode logic to determine a value for a collective state of the set of multiple OTP bits; and
    a control element to control access to at least one resource of the integrated circuit device based on a value of the collective state for the set of multiple OTP bits.

2. The integrated circuit device of claim 1, wherein the decode logic outputs one of a high signal or a disable signal for the control element, and wherein the control element enables or disables access to the at least one resource based on whether the decode logic outputs the high or low signal.

3. The integrated circuit of claim 1, wherein the decode logic determines any one of at least four values for the collective state of the set of multiple OTP bits.

4. The integrated circuit of claim 3, wherein the decode logic outputs the high signal in response to determining the value of the collective state is either of at least two of the at least four values, and wherein the decode logic outputs the disable signal in response to determining the value of the collective state is either of at least two of the at least four values.

5. The integrated circuit device of claim 1, wherein the control element controls access to at least one port of the integrated circuit device.

6. The integrated circuit device of claim 1, wherein the control element controls access to a debug resource.

7. The integrated circuit device of claim 1, wherein the programming module is operable to cause the value of the collective state to sequentially change from a first value to at least a final value.

8. The integrated circuit device of claim 7, wherein the control element is most restrictive of the at least one resource when the collective state has the final value.

9. The integrated circuit device of claim 7, wherein the programming module is to:
    enable or provide a first trigger to change the collective state from the first value to a second value, wherein the control element restricts access to the at least one resource when the collective state has the second value;
    enable or provide a second trigger to change the collective state from the second value to a third value, wherein the control element enables access to the at least one resource when the collective state has the third value; and
    enable or provide a third trigger to change the collective state from the third value to a fourth value, wherein the fourth value is the final value.

10. The integrated circuit device of claim 9, wherein the programming module is to:
    implement a first security mechanism to restrict an unauthorized operator from changing the value of the collective state from the second value to the third value.

11. The integrated circuit device of claim 9, wherein the programming module is to:
    change the collective state from the first value to the second value by flipping a value of a first bit of the set of OTP bits;
    change the collective state from the second value to the third value by flipping a value of a second bit of the set of OTP bits; and
    change the collective state from the third value to the fourth value by flipping a value of a first bit of the set of OTP bits.

12. The integrated circuit device of claim 9, wherein the first trigger is implemented before the integrated circuit device is packaged a ship for use, and wherein the second trigger and third trigger are implemented after the integrated circuit device is unpackaged and used on return by the customer.

13. The integrated circuit device of claim 1, wherein the control element includes an AND gate.

14. A control sub-system for an integrated circuit device, the sub-system comprising:

a set of multiple one-time programmable (OTP) bits to control access to a resource of the integrated circuit device;

a programming module operable to trigger a change in each bit of the set, including (i) to change a first bit of the set to disable access to the resource, (ii) to change a second bit of the set to re-enable access to the resource; and (iii) to change a third bit of the set to re-disable access to the resource.

15. A method for controlling access to a resource of an integrated circuit device, the method comprising:

interfacing with a set of multiple one-time programmable (OTP) bits;

triggering a change to a first bit of the set to disable access to the resource;

triggering a change to a second bit of the set to re-enable access to the resource; and triggering a change to a third bit of the set to disable access to the resource.

* * * * *